US011681914B2

(12) United States Patent
Dang et al.

(10) Patent No.: US 11,681,914 B2
(45) Date of Patent: Jun. 20, 2023

(54) DETERMINING MULTIVARIATE TIME SERIES DATA DEPENDENCIES

(71) Applicant: International Business Machines Corporation, Armonk, NY (US)

(72) Inventors: Xuan-Hong Dang, Chappaqua, NY (US); Yunqi Guo, Los Angeles, CA (US); Syed Yousaf Shah, Yorktown Heights, NY (US); Petros Zerfos, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 16/870,041

(22) Filed: May 8, 2020

(65) Prior Publication Data
US 2021/0350225 A1 Nov. 11, 2021

(51) Int. Cl.
*G06N 3/08* (2023.01)
*G06N 3/04* (2023.01)
(Continued)

(52) U.S. Cl.
CPC ............ *G06N 3/08* (2013.01); *G06F 17/15* (2013.01); *G06N 3/04* (2013.01); *G06N 20/00* (2019.01)

(58) Field of Classification Search
CPC .......... G06F 17/15; G06N 20/00; G06N 3/04; G06N 3/0454; G06N 3/08; G06N 3/084; G06N 3/088; G06N 7/005
See application file for complete search history.

(56) References Cited

U.S. PATENT DOCUMENTS 9,659,254 B2 5/2017 Achin et al.
2006/0125105 A1 6/2006 Masayuki et al.
(Continued)

FOREIGN PATENT DOCUMENTS

CA 2239602 12/1998
CN 107563332 1/2018
(Continued)

OTHER PUBLICATIONS

Jay Heo, "Uncertainty-Aware Attention for Reliable Interpretation and Prediction," Dec. 3-8, 2018, 32nd Conference on Neural Information Processing Systems (NeurIPS 2018), Montréal, Canada,pp. 1-5).*

(Continued)

*Primary Examiner* — Omar S Ismail
(74) *Attorney, Agent, or Firm* — Amin, Turocy & Watson, LLP

(57) ABSTRACT

Techniques regarding multivariate time series data analysis are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a time series analysis component that generates a machine learning model that discovers a dependency between multivariate time series data using an attention mechanism controlled by an uncertainty measure.

17 Claims, 13 Drawing Sheets
(2 of 13 Drawing Sheet(s) Filed in Color)

(51) Int. Cl.
G06F 17/15 (2006.01)
G06N 20/00 (2019.01)

(56) References Cited

U.S. PATENT DOCUMENTS

| | | | | |
|---|---|---|---|---|
| 2008/0255911 | A1* | 10/2008 | Khosla | G06Q 10/0639 |
| | | | | 705/7.38 |
| 2009/0138415 | A1* | 5/2009 | Lancaster | G06N 5/04 |
| | | | | 706/11 |
| 2010/0179930 | A1* | 7/2010 | Teller | G06N 20/00 |
| | | | | 706/12 |
| 2014/0079297 | A1* | 3/2014 | Tadayon | G06F 18/00 |
| | | | | 382/118 |
| 2014/0108324 | A1* | 4/2014 | Chen | G06F 17/16 |
| | | | | 706/52 |
| 2016/0328253 | A1* | 11/2016 | Majumdar | G06F 9/45504 |
| 2017/0206452 | A1 | 7/2017 | Herzog | |
| 2017/0206464 | A1 | 7/2017 | Clayton et al. | |
| 2017/0314961 | A1* | 11/2017 | Chen | G06F 17/18 |
| 2018/0046926 | A1 | 2/2018 | Achin et al. | |
| 2018/0060665 | A1 | 3/2018 | Song et al. | |
| 2018/0060666 | A1 | 3/2018 | Song et al. | |
| 2018/0262525 | A1* | 9/2018 | Yan | G06N 20/00 |
| 2018/0300621 | A1* | 10/2018 | Shah | G06N 3/08 |
| 2018/0300829 | A1* | 10/2018 | Crabtree | G06N 20/00 |
| 2019/0034497 | A1* | 1/2019 | Song | G06F 16/2465 |
| 2019/0391574 | A1 | 1/2019 | Cheng et al. | |
| 2019/0113973 | A1* | 4/2019 | Coleman | A61B 5/369 |
| 2019/0163549 | A1* | 5/2019 | Huang | G06F 11/0721 |
| 2019/0235105 | A1 | 8/2019 | Stracuzzi et al. | |
| 2019/0260768 | A1* | 8/2019 | Mestha | H04L 63/1466 |
| 2019/0287012 | A1 | 9/2019 | Celikyilmaz et al. | |
| 2019/0354836 | A1* | 11/2019 | Shah | G06N 3/044 |
| 2019/0384983 | A1* | 12/2019 | Katoch | G06V 20/38 |
| 2020/0027105 | A1 | 1/2020 | Ling et al. | |
| 2020/0184278 | A1* | 6/2020 | Zadeh | G06N 3/044 |
| 2020/0283016 | A1* | 9/2020 | Blaiotta | G06V 20/56 |
| 2020/0285983 | A1* | 9/2020 | Bhattacharyya | G06F 16/1744 |
| 2020/0285997 | A1* | 9/2020 | Bhattacharyya | G06N 7/01 |
| 2021/0049460 | A1* | 2/2021 | Ahn | G06N 3/045 |
| 2021/0174248 | A1* | 6/2021 | Wetherbee | H04L 41/0883 |
| 2021/0406792 | A1* | 12/2021 | Bhardwaj | G06Q 10/067 |
| 2022/0012874 | A1* | 1/2022 | Maier-Hein | G06T 7/0012 |

FOREIGN PATENT DOCUMENTS

| | | |
|---|---|---|
| CN | 108875592 A | 11/2018 |
| CN | 110378044 A | 10/2019 |
| CN | 110610232 A | 12/2019 |
| EP | 1146649 | 10/2001 |
| EP | 3 333 723 | 6/2018 |
| WO | 2016119429 | 8/2016 |
| WO | 2017/130089 A1 | 8/2017 |
| WO | 2018/032765 | 2/2018 |
| WO | 2019219799 | 11/2019 |

OTHER PUBLICATIONS

Yunxiao Wang, "Multivariate Time Series Prediction Based on Optimized Temporal Convolutional Networks with Stacked Autoencoders," Dec. 5, 2019, Proceedings of Machine Learning Research 101:157-172, 2019,pp. 159-168).*
Chenyou Fan, "Multi-Horizon Time Series Forecasting with Temporal Attention Learning," Jul. 25, 2019, Applied Data Science Track Paper—KDD '19, Aug. 4-8, 2019, Anchorage, AK, USA—p. 2527-2532).*
Charles Blundell, "Weight Uncertainty in Neural Networks," May 21, 2015, Proceedings of the 32nd International Conference on Machine Learning, Lille, France, 2015. JMLR: W&CP vol. 37, pp. 1-5.).*
Keuntaek Lee,"Ensemble Bayesian Decision Making with Redundant Deep Perceptual Control Policies," Feb. 17, 2020,2019 18th IEEE International Conference on Machine Learning and Applications (ICMLA),pp. 831-834.*
ShenlongWang,"Measurement uncertainty evaluation in whiplash test model via neural network and support vector machine-based Monte Carlo method," Feb. 16, 2018,Measurement vol. 119, Apr. 2018, pp. 231-241.*
Yujia Xue,"Reliable deep-learning-based phase imaging with uncertainty quantification," May 7, 2019,Optica vol. 6, Issue 5, pp. 618-629 (2019),pp. 618-622.*
Xuan-Hong Dang,"seq2graph: Discovering Dynamic Non-linear Dependencies from Multivariate Time Series," Feb. 24, 2020,2019 IEEE International Conference on Big Data (Big Data), pp. 1774-1779.*
Yagmur Gizem Cinar,"Time Series Forecasting using RNNs: an Extended Attention Mechanism to Model Periods and Handle Missing Values," Mar. 2017,ResearchGate, https://www.researchgate.net/publication/315696041,pp. 1-7.*
Non-Final Office Action received for U.S. Appl. No. 15/982,615 dated Sep. 8, 2022, 34 pages.
Communication pursuant to Article 94(3) EPC received for E.P. Patent Application Serial No. 19724818.0 dated Aug. 31, 2022, 04 pages.
Notice of Reasons for Refusal received for Japanese Patent Application Serial No. 2020-553589 dated Sep. 20, 2022, 06 pages.
Hsu, D., "Time Series Compression Based on Adaptive Piecewise Recurrent Autoencoder", arXiv:1707.07961v2, Aug. 16, 2017, 10 pages.
Communication pursuant to Article 94(3) EPC received for E.P. Patent Application Serial No. 19724818.0 dated Oct. 11, 2022 04 pages.
Reply dated Oct. 4, 2022 to Communication pursuant to Article 94(3) EPC received for E.P. Patent Application Serial No. 19724818.0 dated Aug. 31, 2022, 03 pages.
Communication pursuant to Article 94(3) EPC received for EP Patent Application Serial No. 19724818.0 dated Mar. 18, 2021, 05 pages.
Blundell, et al. Weight Uncertainty in Neural Network Proceedings of the 32nd International Conference on Machine Learning, PMLR 37:1613-1622, 2015. 10 pages.
Xu, et al. "Show, Attend and Tell: Neural Image Caption Generation with Visual Attention." arXiv:1502.03044v3 [cs.LG] Apr. 19, 2016. 22 pages.
Heo, et al. Uncertainty-aware attention for reliable interpretation and prediction. In Advances in Neural Information Processing Systems, 2018. 10 pages.
Song, et al. "A Spanias, Attend and diagnose: Clinical time series analysis using attention models" auarXiv:1711.03905v2 [stat.ML] Nov. 19, 2017. 8 pages.
Fan, et al. "Multi-horizon time series forecasting with temporal attention learning." Conf. Ttl: 25th ACM SIGKDD International Conf. on Knowledge Discovery and Data Mining; 2019; Publisher: Association for Computing Machinery; Country of Publication: USA; ISBN: 9781450362016; Database: Ei Compendex. 9 pages.
Wilk "Recurrent Neural Networks in Ruby" Jhttp://blog.josephwilk.net/ruby/recurrent-neural-networks-in-ruby.html, Oct. 29, 2012. 7 pages.
Algobeans "Convolutional Neural Networks (CNN) Introduction" Algobeans, https://algobeans.com/2016/01/26/introduction-to-convolutional-neural-network/, Jan. 26, 2016. 7 pages.
Dang, et al. "seq2graph: Discovering Dynamic Non-linear Dependencies from Multivariate Time Series." 2019 IEEE International Conference on Big Data (Big Data). 10 pages.
Saha, et al. "A Comprehensive Guide to Convolutional Neural Networks—the ELi5 Way." Towards Data Science, https://towardsdatascience.com/a-comprehensive-guide-to-convolutional-neural-networks-the-eli5-way-3bd2b1164a53?gi=31de21475687, Dec. 15, 2018, Last Accessed May 4, 2020. 13 pages.
Bahdanau, et al. "Neural machine translation by jointly learning to align and translate" arXiv:1409.0473v7 [cs.CL] May 19, 2016. 15 pages.

(56) References Cited

OTHER PUBLICATIONS

Bao, et al. "A deep learning framework for financial time series using stacked autoencoders and long-short term memory." PLoS ONE 12(7): e0180944. https://doi.org/10.1371/journal.pone.0180944, 2017. 24 pages.
Byerly, et al. "A Branching and Merging Convolutional Network with Homogeneous Filter Capsules." arXiv:2001.09136 2020. 17 pages.
Graves, et al. "Neural Turing Machines" arXiv:1410.5401v2 [cs.NE] Dec. 10, 2014. 26 pages.
Hmamouche, et al. "Large multivariate time series forecasting: Survey on methods and scalability." Utilizing big data paradigms for business intelligence. IGI Global. 2019. 28 pages.
Kingma, et al. "Auto-Encoding Variational Bayes." arXiv:1312.6114v10 [stat.ML] May 1, 2014. 14 pages.
Luong, et al. "Effective Approaches to Attention-based Neural Machine Translation." arXiv:1508.04025v5 [cs.CL] Sep. 20, 2015. 11 pages.
Mahalakshmi, et al. "A survey on forecasting of time series data" In 2016 International Conference on Computing Technologies and Intelligent Data Engineering (ICCTIDE'16), 1-8. IEEE. 8 pages.
Murphy "Machine Learning: A Probabilistic Perspective" The MIT Press, 2012. 1098 pages.
Neal "Bayesian Learning for Neural Networks" Springer-Verlag New York 1996. 193 pages.
Vaswani, et al. "Attention is all you need." In arXiv:1706.03762v5 [cs.CL] Dec. 6, 2017. 15 pages.
Yang, et al. "Hierarchical attention networks for document classification." In Proceedings of the 2016 conference of the North American chapter of the association for computational linguistics: human language technologies, 1480-1489.
Ziat et al., "Spatio-Temporal Neural Networks for Space-Time Series Forecasting and Relations Discovery," arXiv:1804.08562v1 [cs.LG], Apr. 23, 2018, 10 pages.
Britz, "WILDML Artificial Intelligence, Deep Learning, and NLP," http://www.wildml.com/2016/01/attention-and-memory-in-deep-learning-and-nlp/, Jan. 3, 2016, 8 pages.
Shah et al., "Dependency Analysis of Cloud Applications for Performance Monitoring using Recurrent Neural Networks," IEEE BigData, 2017, 10 pages.
Kim et al., "Interpretable Deep Neural Networks for Enhancer Prediction," IEEE International Conference on Bioinformatics and Biomedicine, 2015, 8 pages.
Kim et al., "Opening up the blackbox: an interpretable deep neural network-based classifier for cell-type specific enhancer predictions," BMC Systems Biology, 2016, pp. 243-258, 16 pages.
Dhamala et al., "Estimating Granger causality from Fourier and wavelet transforms of time series data," arXiv:0711.2729v1 [physics.data-an], Nov. 17, 2007, 6 pages.
Arnold et al., "Temporal Causal Modeling with Graphical Granger Methods," KDD'07, Aug. 12-15, 2007, 10 pages.
Oancea et al., "Time Series Forecasting Using Neural Networks," arXiv preprint arXiv:1401.1333, 2014, 7 pages.
Dang et al., "Dynamic Discovery of Temporal Lagged and Inter-Dependencies in Multivariate Time Series," 32nd Conference on Neural Information Processing Systems (NIPS), 2018, 14 pages.
International Search Report and Written Opinion received for PCT Application Serial No. PCT/EP2019/062587 dated Aug. 8, 2019, 13 pages.
Cinar et al., "Time Series Forecasting using RNNs: an Extended Attention Mechanism to Model Periods and Handle Missing Values", Arxiv.Org, Cornell University Library, Mar. 29, 2017, 14 pages.
Mell, Peter, et al. "The NIST Definition of Cloud Computing." National Institute of Standards and Technology. Sep. 2011. 7 pages.
Final Office Action Received for U.S. Appl. No. 15/982,615 dated Feb. 2, 2022, 40 pages.
Xin et al., "Recurrent Temporal Sparse Autoencoder for Attention-based Action Recognition", International Joint Conference on Neural Networks, 2016, pp. 456-463.
Advisory Action Received for U.S. Appl. No. 15/982,615 dated Apr. 5, 2022, 12 pages.
Xu et al., "Learning Multimodal Attention LSTM Networks for Video Captioning", Proceedings of the 25th ACM international conference on Multimedia, 2017, 9 pages.
Communication pursuant to Article 94(3) EPC received for EP Patent Application Serial No. 19724818.0 dated Mar. 17, 2022, 5 pages.
Non Final office action received for U.S. Appl. No. 15/982,615 dated Jun. 23, 2021, 94 pages.
Qin et al., "A Dual-Stage Attention-Based Recurrent Neural Network for Time Series Prediction", Aug. 14, 2017, 17 pages.
Zhou et al., "Predicting Multi-Step Citywide Passenger Demands Using Attention-Based Neural Networks", In Proceedings of the Eleventh ACM International Conference on Web Search and Data Mining, Association for Computing Machinery, Feb. 5-9, 2018, pp. 736-744.
Hsu, daniel., "Time Series Compression Based on Adaptive Piecewise Recurrent Autoencoder", Aug. 17, 2017, 10 pages.
International Search Report and Written Opinion for International Application No. PCT/IB2021/053445 dated Aug. 12, 2021, 9 pages.
Yeh, Cheng-Han et al. Interpretable Multi-Task Learning for 1-20 Product Quality Prediction with Attention Mechanism 2019 IEEE 35th International Conference on Data Engineering (ICDE) Jun. 6, 2019.

\* cited by examiner

DETERMINING MULTIVARIATE TIME SERIES DATA DEPENDENCIES

BACKGROUND

The subject disclosure relates to determining dependencies from multivariate time series data, and more specifically, to employing deep learning neural networks to determine the multivariate time series data dependencies with confidence values.

Deep learning neural networks have become benchmark models for a number of machine learning problems, such as: neural machine translation, image classification, and caption generation. However, the use of deep learning neural networks in time series analysis remains challenging, and has traditionally focused on the conventional task of forecasting time series data. For many practical time series applications, discovering dependencies among multivariate time series data with confidence can help explain correlated and/or causal events behind the observed data, providing more insights into the time series behaviors, and hence assist the users in making better decisions. Such applications can include, for example, cloud services management, financial investments, and healthcare safety.

The success behind deep learning stems not only from its capability of generating complex and informative features through applying multiple steps of non-linear data transformations, but also from the employment of attention mechanisms that can work as memory access mechanisms by generating larger attentive coefficients for input features that are relevant to the learning task. However, the attention mechanisms can be associated with a high amount of instability as its learning process is typically unsupervised with no explicit ground truths for attention available during the training phase. Moreover, time series data can be highly noisy, volatile and time-varying; thus, modeling the time series data using conventional neural networks can lead to over-confidence on both dependencies and predicted values as well as a lack of accuracy in assessing the uncertainty in the data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can determine dependencies within multivariate time series data with certainty values are described.

According to an embodiment, a system is provided. The system can comprise a memory that can store computer executable components. The system can also comprise a processor, operably coupled to the memory, and that can execute the computer executable components stored in the memory. The computer executable components can comprise a time series analysis component that can generate a machine learning model that discovers a dependency between multivariate time series data using an attention mechanism based on an uncertainty measure. An advantage of such a system can be the enablement of highly accurate predictions based on largely unsupervised machine learning training.

In some examples, the system can further comprise an encoder component that can encode the multivariate time series data by matching data different sampling rates across constituted series of the multivariate time series data. The encoding can render the multivariate time series data scalable and parallelizable. The system can also comprise an attention decoder component that can regularize attention among the encoded multivariate time series data based on the uncertainty measure using an attention network layer of the machine learning model. An advantage of such a system can be the encoding of multivariate time series data in manner that enables the data to be scalable and parallelizable despite long data sequences.

According to an embodiment, a computer-implemented method is provided. The computer-implemented method can comprise generating, by a system operatively coupled to a processor, a machine learning model that discovers a dependency between multivariate time series data using an attention mechanism based on an uncertainty measure. An advantage of such a computer-implemented method can be the implantation of attention mechanisms that can regularize a deep neural network away from learning volatile or random attentions.

In some examples, the computer-implemented method can further comprise regularizing, by the system, attention among the encoded multivariate time series data based on the uncertainty measure using an attention network layer of the machine learning model. The computer-implemented method can also comprise generating, by the system, an uncertainty quantification regarding the dependency via a Monte Carlo sampling performed at the attention network layer. The multivariant time series data can characterize a measurable property. Moreover, the computer-implemented method can comprise predicting, by the system, a value of the measurable property based on the discovered dependency and the uncertainty quantification. An advantage of such a computer-implemented method can be insight into the correlated and/or causal relationship between multiple variables characterizing the operating state of an observable system.

According to an embodiment, a computer program product for analyzing multivariate time series data is provided. The computer program product can comprise a computer readable storage medium having program instructions embodied therewith. The program instructions can be executable by a processor to cause the processor to generate, by the processor, a machine learning model that discovers a dependency between the multivariate time series data using an attention mechanism based on the uncertainty measure. An advantage of such a computer program product can be the leveraging of the convergence rate of the machine learning model as it narrows down the searching space for attentive patterns in the data.

In some examples, the program instructions can further cause the processor to encode, by the processor, the multivariate time series data by matching different data sampling rates across constituted series of the multivariate time series data, wherein encoding renders the multivariate time series data scalable and parallelizable. Additionally, the program instructions can further cause the processor to regularize, by the processor, attention among the encoded multivariate time series data based on the uncertainty measure using an attention network layer of the machine learning model. Moreover, the program instructions can further cause the processor to penalize, by the processor, attention configurations of the encoded multivariate time series data that result in the uncertainty measure being smaller than a defined threshold. An advantage of such a computer program product can be the use of the Bayesian approach to learn a probability distribution over neural weights of a neural network model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
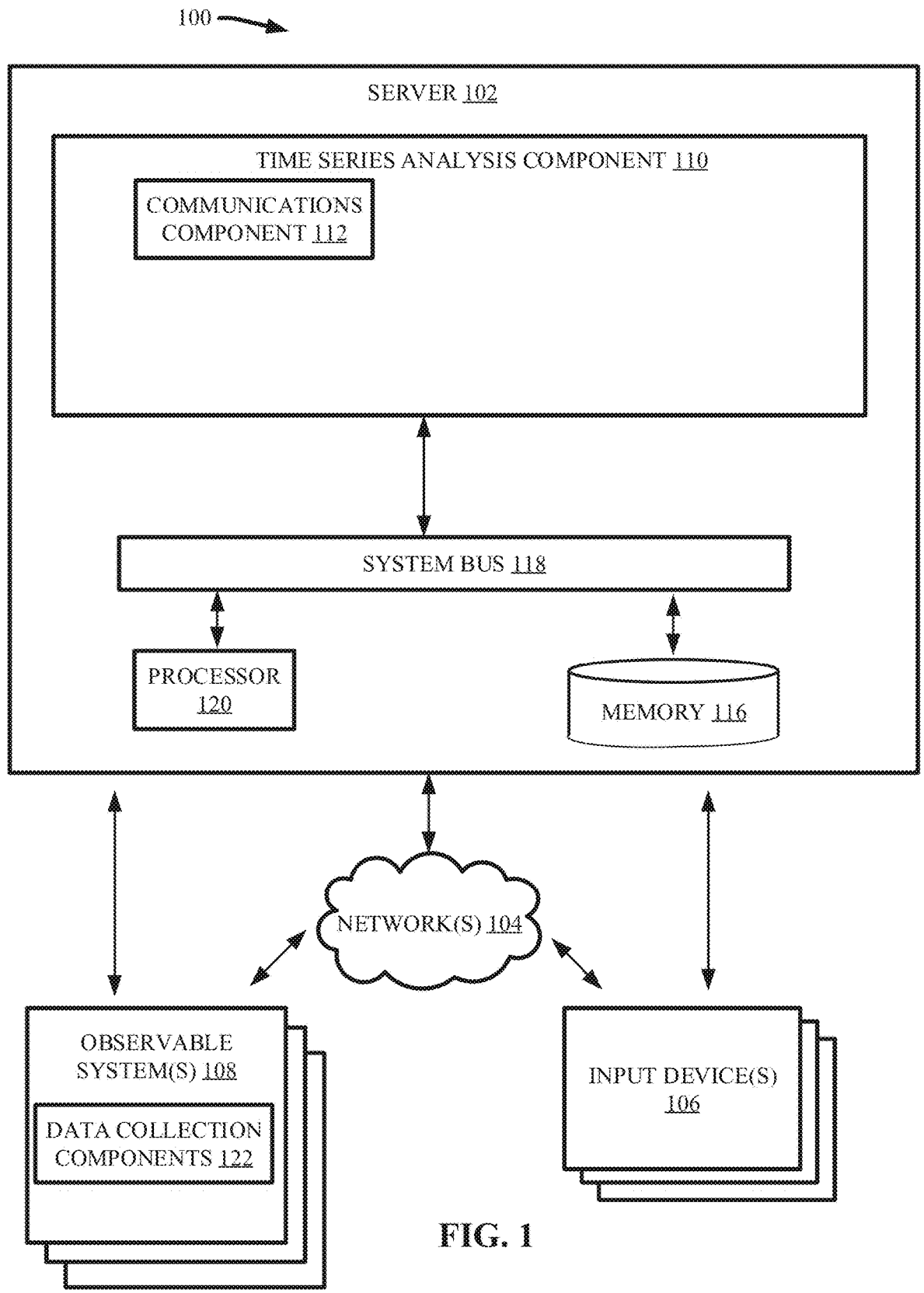
FIG. 1 illustrates a block diagram of an example, non-limiting system that can discover dependencies within multivariate time series data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of time series data analysis; the present disclosure can be implemented to produce a solution to one or more of these problems by employing a deep neural network model that can learn to discover stable, reliable inter-timeseries dependencies while offering confidence values associated with generated outputs. Advantageously, one or more embodiments described herein can employ one or more attention mechanism that implement one or more Shannon entropy based penalties that can leverage the convergence rate of a machine learning model as the model narrows down the searching space for attentive patterns in time series data. Additionally, unlike conventional deep learning models that employ point estimated approaches, various embodiments described herein can learn an ensemble of infinite number of deep learning models whose weights can be characterized by one or more probability distributions.

Various embodiments of the present invention can be directed to computer processing systems, computer-implemented methods, apparatus and/or computer program products that facilitate the efficient, effective, and autonomous (e.g., without direct human guidance) time series data analysis. For example, in one or more embodiments described herein can discover one or more time series data dependencies (e.g., interdependencies), generate confidence values regarding the discovered dependencies, and forecast future time series data based on the dependencies and/or the associate confidence values. For instance, one or more embodiments described herein can regard deep learning neural networks that can employ one or more attention mechanisms that penalize a learning objective function based on an uncertainty measure (e.g., Shannon entropy) that is directly computed from attention coefficients during a training process. Thereby, various embodiments can regularize the deep neural network away from learning volatile or random attentions.

The computer processing systems, computer-implemented methods, apparatus and/or computer program products employ hardware and/or software to solve problems that are highly technical in nature (e.g., unsupervised discovery of multivariate time series dependencies), that are not abstract and cannot be performed as a set of mental acts by a human. For example, an individual, or a plurality of individuals, cannot discover interdependencies in a vast amount of time series data with the efficiency achieved by the various embodiments described herein. For instance, an individual cannot readily detect and/or analyze minute pattern recognitions across multiple variables in time series data that can comprise dozens, hundreds, or even thousands of time frame windows. Further, various embodiments described herein can employ machine learning technology that can enable a level of data confidentiality that cannot be replicated by human performance.

Also, one or more embodiments described herein can constitute a technical improvement over conventional time series data analysis by generating confidence values associated with the discovered time series data dependencies so as to elaborate upon correlated and/or causal events behind observed data and/or time series behaviors. Additionally, various embodiments described herein can demonstrate a technical improvement over conventional time series analyses by exploiting a Bayesian approach that enables the deep learning neural network to learn a probability distribution over the neural weights and thereby strengthen the model's notation of reliability.

Further, one or more embodiments described herein can have a practical application by providing insight into the operation and/or maintenance of one or more mechanical and/or computer systems and/or facilities. For instance, various embodiments described herein can discover time series data dependencies that can characterize a correlated and/or causal relation between variables such that the effect on one variable from the manipulation of another variable can be predicted based on observed experiences. One or more embodiments described herein can control one or more attention network layers of a deep learning neural network to employ an attention mechanism that penalizes attention configurations that result in high and unstable uncertainty measures (e.g., Shannon entropy values). Thereby, the one or more embodiments can leverage the convergence rate of the machine learning model while narrowing down the search space for attentive patterns in the data.

As used herein, the term "machine learning" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning task can be facilitated by one or more artificial intelligence models trained on one or more datasets in accordance with one or more model configuration settings.

As used herein, the term "machine learning model" can refer to a computer model that can be used to facilitate one or more machine learning tasks, wherein the computer model can simulate a number of interconnected processing units that can resemble abstract versions of neurons. In various embodiments described herein, machine learning models can be employed in the form of one or more neural network models. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze data with unknown outcomes, based on lessons learning from training data, to facilitate one or more machine learning tasks. Example neural network models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

FIG. 1 illustrates a block diagram of an example, non-limiting system 100 that can discover dependencies in multivariate time series data. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or observable systems 108. The server 102 can comprise time series analysis component 110. The time series analysis component 110 can further comprise communications component 112. Also, the server 102 can comprise or otherwise be associated with at least one memory 116. The server 102 can further comprise a system bus 118 that can couple to various components such as, but not limited to, the time series analysis component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or observable systems 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the time series analysis component 110 can be provided on the one or more servers 102, it should be appreciated that the architecture of system 100 is not so limited. For example, the time series analysis component 110, or one or more components of time series analysis component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more model settings, thresholds, and/or preferences of various embodiments described herein into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the one or more observable systems 108 can be one or more mechanical and/or computer systems under observation by the time series analysis component 110. Additionally, the one or more observable systems 108 can comprise one or more data collection components 122. The one or more data collection components 122 can measure, detect, collect, and/or aggregate multivariate time series data regarding the one or more mechanical and/or computer systems. For example, the multivariate time series data can include one or more parameter values characterizing one or more measurable properties of the one or more mechanical and/or computer systems. In various embodiments, the one or more data collection components 122 can include one or more sensors. Example sensors can include, but are not limited to: pressure sensors, vibration sensors, temperature sensors, microphones, barometers, accelerometers, piezoelectric sensors, motion sensors, a combination thereof, and/or the like. For instance, the one or more measurable properties can be detected and/or measured by the one or more sensors. In another instance, the one or more measurable properties can regard data transactions, management, modifications, and/or the like. The one or more data collection components 122 can generate, aggregate, collect, and/or share time series data with the time series analysis component 110 (e.g., via a direct electrical connection and/or one or more networks 104).

The communications component 112 can receive one or more settings and/or preferences entered by the one or more input devices 106, and share the settings and/or preferences with the associate components of the time series analysis component 110. Additionally, the communications component 112 can receive multivariate time series data collected by the one or more observable systems 108 (e.g., data collection components 122), and share the multivariate time series data with the associate components of the time series analysis component 110. In various embodiments, the communications 116 112 can communicate with the one or more input devices 106 and/or observable systems 108 (e.g., data collection component 122) via a direct electrical connection and/or the one or more networks 104.

In various embodiments, the time series analysis component 110 can analyze the time series data made available by the one or more data collection components 122 to discover dependencies among various time series using deep learning neural networks that employ one or more Bayesian inferences. The multivariate time series data ("MTS") consisting of D variables (e.g., component time series) can be denoted herein in accordance with Equation 1 below.

$$MTS = \{x_t\}_{t=1}^{N} \quad (1)$$

Wherein "x" can represent MTS's measurement at a specific time point, "N" can represent the total time points so far in MTS, and "t" can represent the respective time stamp. Each $x_t \in R^D$ hence contains D measurements of MTS at time stamp t. Further, a d-th component series $\{x_t^{(d)}\}_{t=1}^{N}$ (with d=1 . . . D) can depend not only on its past values but also has some dependency on the other times series in the MTS, which can decide its future values. Therefore, $x_t^{(d)} \approx f^{\omega}(\{x_{t-1}, \ldots, x_{t-m}\})$, where $f^{\omega}$ parameterized by $\omega$ can be an approximate function such as neural networks, and m is a positive integer number. Additionally, various embodiments can assume that only a subset of variables in MTS will impact $x_t^{(d)}$ value, and the time series analysis component 110 can discover such influence dependencies with stability and confidence.

Figure 2:
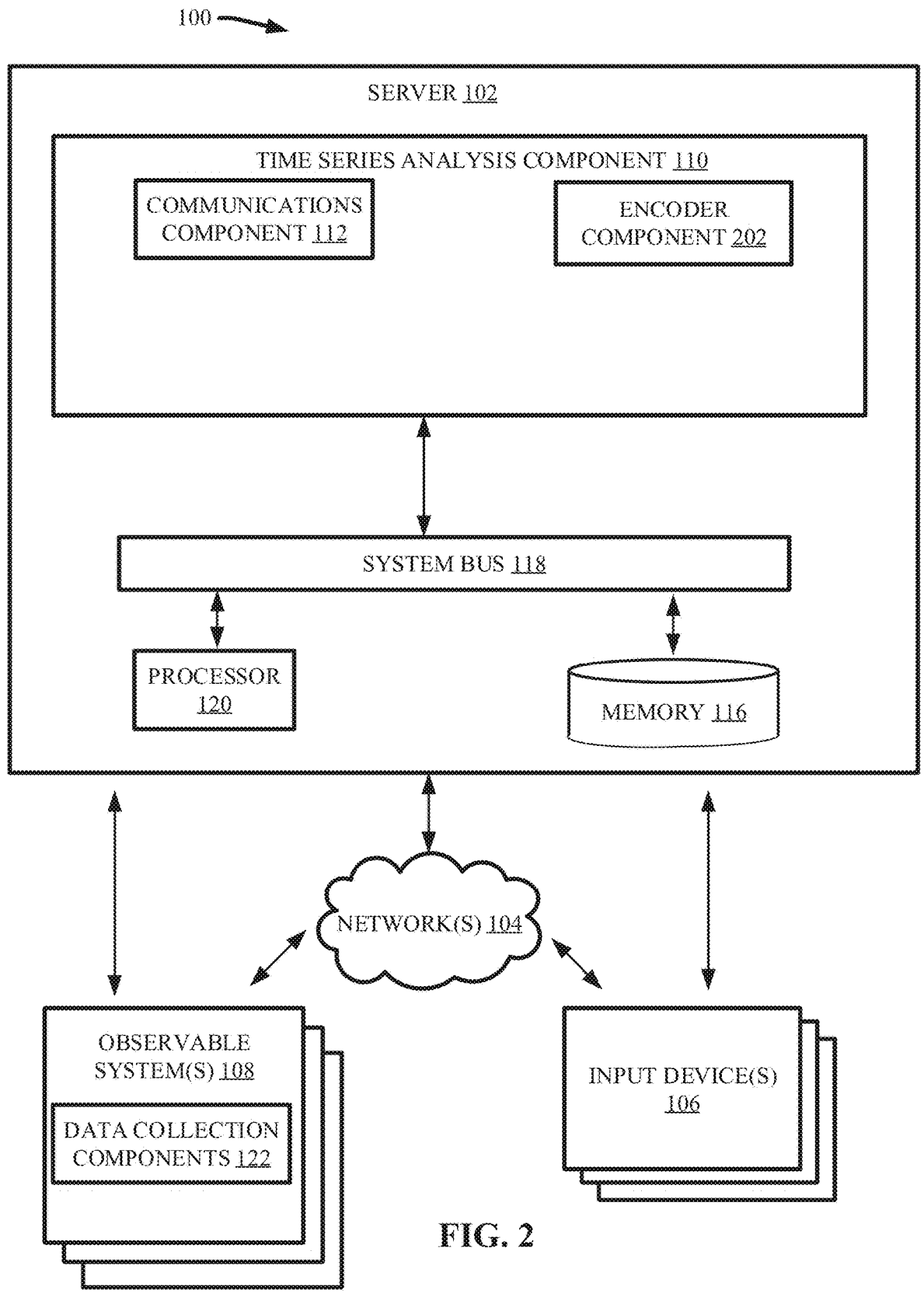
FIG. 2 illustrates a block diagram of an example, non-limiting system that can encode multivariate time series data so as to render the data scalable and parallelizable in accordance with one or more embodiments described herein.

FIG. 2 illustrates a diagram of the example, non-limiting system 100 further comprising encoder component 202 in accordance with one or more embodiments described herein. Repetitive description of like elements employed in other embodiments described herein is omitted for sake of brevity. In various embodiments, the encoder component 202 can encode the multivariate time series data by matching different data sampling rates across constituted series of the multivariate time series data; thereby rendering the data scalable and parallelizable.

In one or more embodiments, the encoder component 202 can learn intermediate feature vectors for the multivariate time series data at time stamp t by various encoding networks of a deep learning neural network model employed by the time series analysis component 110. For instance, the intermediate feature vectors can be denoted by $\{h_t^{(i)}\}_{i=1}^{D}$ with respect to D input time series at time point t. Therefore, $h_t^{(i)} = f^{\omega_E}(\{x_{t-1}^{(i)}, \ldots, x_{t-m}^{(i)}\})$, with $\omega_E$ as the parameters of the encoder network (e.g., wherein "E" can denote the encoder network). Learning the intermediate feature vectors via conventional RNNs (e.g., LSTMs or GRU) can prohibit parallelized computing and can become inefficient when dealing with long sequences in the multivariate time series data.

The encoder component 202 can build the various encoding networks of the deep learning neural network model employed by the time series analysis component 110 based on a Transformer network approach, which can enhance efficiency by eliminating recurrent connections. For example, the encoder component 202 can adopt a multi-head attention structure. The encoder component 202 can train each encoder network of the deep learning neural network model (e.g., denoted by $f^{\omega_E}$) for each component i-th time series. At time stamp t, input from i-th time series to $f^{\omega_E}$ can be a sequence $\{x_{t-1}^{(i)}, \ldots, x_{t-m}^{(i)}\}$, which can be well aligned with a positioning encoding vector that can incorporate information about the entry order of the times series sequence. In one or more embodiments, the encoder component 202 can employ a sinusoidal function for the positional encoding task. Through multiple layers of non-linear transformation and self-attention, $f^{\omega_E}$ can output the feature encoding vector $h_t^{(i)}$ represented for the i-th time series at time stamp t.

Figure 3:
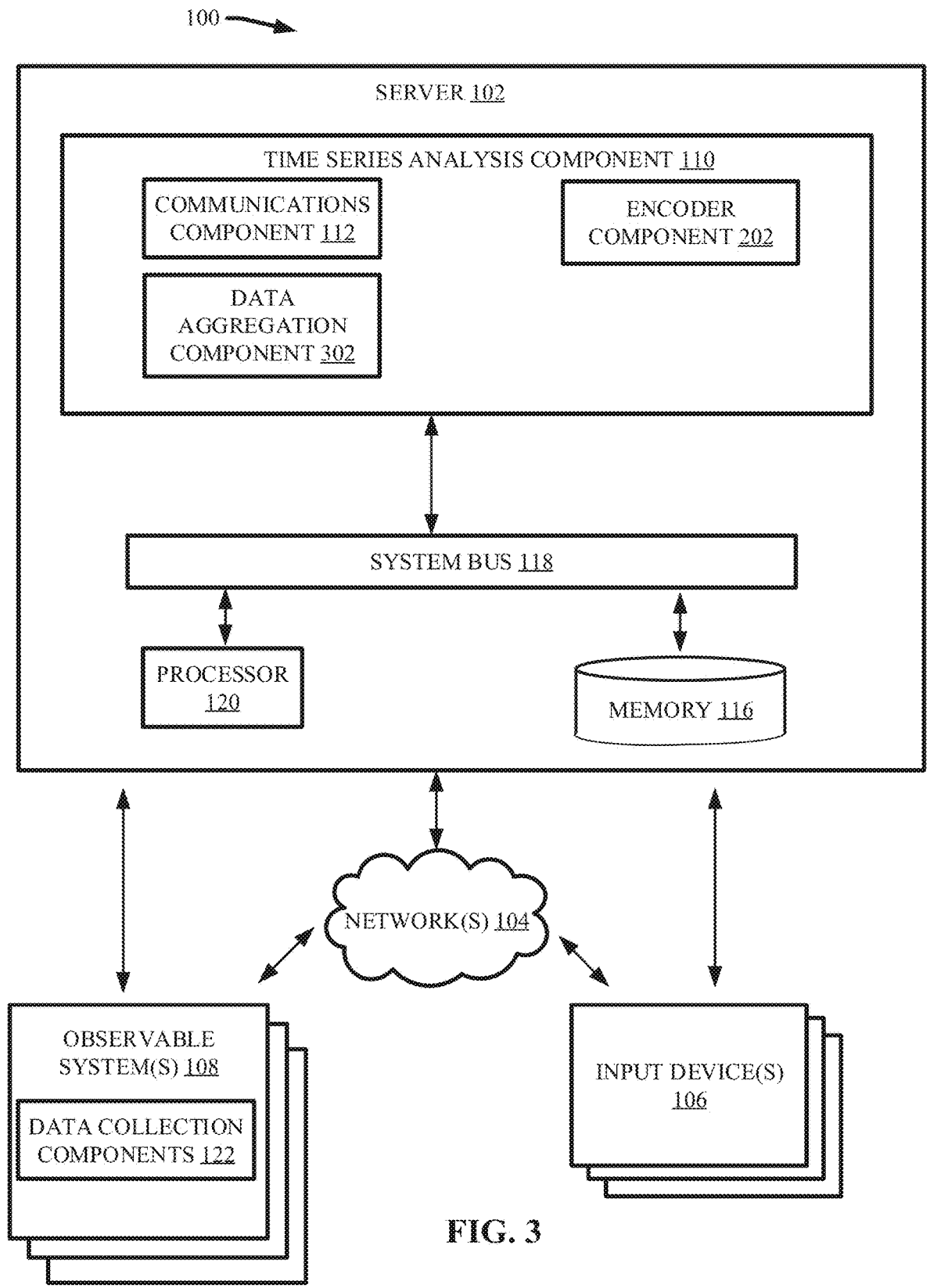
FIG. 3 illustrates a block diagram of an example, non-limiting system that can aggregate and distribute encoded multivariate time series data across one or more attention networks layers of a machine learning model in accordance with one or more embodiments described herein.

FIG. 3 illustrates a diagram of the example, non-limiting system 100 further comprising aggregation component 302 in accordance with one or more embodiments described herein. Repetitive description of like elements employed in other embodiments described herein is omitted for sake of brevity. In various embodiments, the aggregation component 302 can aggregate the feature encoding vectors generated by the encoding component 202. For example, the aggregation component 302 can aggregate multiple encoding vectors, generated by one or more encoding components 202 and/or encoding networks, in preparation for subsequent distribution to one or more further layers of the deep learning neural network model employed by the time series analysis component 110.

Figure 4:
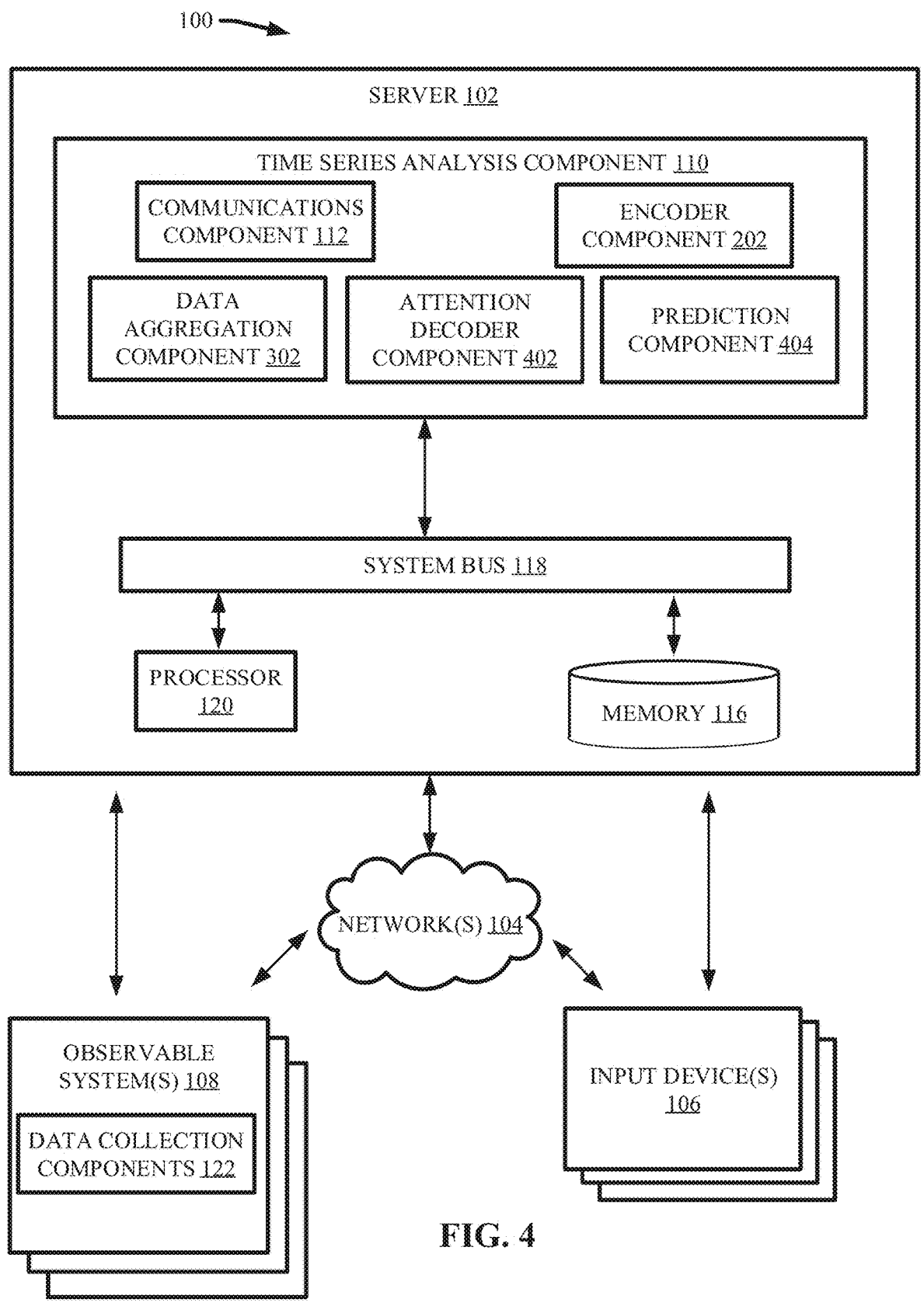
FIG. 4 illustrates a block diagram of an example, non-limiting system that can discover dependencies from multivariate time series data and/or quantify an amount of certainty associated with the dependencies in accordance with one or more embodiments described herein.

FIG. 4 illustrates a diagram of the example, non-limiting system 100 further comprising attention decoder component 402 and/or prediction component 404 in accordance with one or more embodiments described herein. Repetitive description of like elements employed in other embodiments described herein is omitted for sake of brevity. In various embodiments, the attention decoder component 402 can regularize attention among the encoded multivariate time series data based on one or more uncertainty measures (e.g., Shannon entropy values) using one or more attention network layers of the deep learning neural network model employed by the time series analysis component 110. For example, the one or more attention network layers developed by the attention decoder component 402 can penalize attention configurations of the encoded multivariate time series data that result in an uncertainty measure (e.g., Shannon entropy value) that is greater than a defined threshold (e.g., a high and unstable Shannon entropy value). Further, the attention decoder component 402 can further generate one or more uncertainty quantifications regarding one or more discovered dependencies via a Monte Carlo sampling performed at the attention network layer of the machine learning model.

In one or more embodiments, the attention decoder component 402 can adapt one or more attention mechanisms to the context of the multivariate time series to learn a set of variables $\{a_t^{(i)}\}_{i=1}^D$ associated with $\{h_t^{(i)}\}_{i=1}^D$ for each output d-th time series. Depending on model architecture, $\{a_t^{(i)}\}$ can be a scalar or a vector of the same dimensions as that of $\{h_t^{(i)}\}$. Thereby, the attention decoder component 402 can build a context vector, wherein the content of the context vector can be decoded to predict the next value in a d-th time series in accordance with Equation 2 below.

$$c_t = \Sigma_{i=1}^D a_t^{(i)} \odot h_t^{(i)}, x_t^{(d)} = f^{\omega_D}(c_t) \qquad (2)$$

Wherein "$\odot$" can be the element-wise product if $a_t^{(i)}$ is a vector or a multiplication of the decoder network (e.g., wherein "$_D$" can denote the decoder network).

For example, where $\{a_t^{(i)}\}_{i=1}^D$ are non-negative values subject to $\Sigma_i a_t^{(i)} = 1$. As such, where $\{a_t^{(i)}\}_{i=1}^D$ can be interpreted as attention weights correspondingly to $\{h_t^{(i)}\}_{i=1}^D$. A higher value of $a_t^{(i)}$ can imply more relevant information found in $h_t^{(i)}$. Thus, the d-th time series can be dependent on i-th time series at time point t. Toward learning $\{a_t^{(i)}\}_{i=1}^D$, the attention decoder component 402 can employ the additive form $a_t^{(i)} = v_a^T \tanh(W_a \times h_t^{(i)} + b_a)$.

In one or more embodiments, the attention decoder component 402 can learn a posterior distribution of parameters that governs the attention network via a Bayes inference. For example, the distribution can describe the uncertainty in attention and can be analyzed by the attention decoder component 402 to estimate confidence values in discovering time series dependencies. For instance, the neural network parameters can be denoted by $\omega_A$ (e.g., wherein subscript A can represent attention in the model) and can account for learning time series attention set $\{a_t^{(i)}\}_{i=1}^D$ (e.g., employed to predict $x_t^{(d)}$). The prior distribution can be denoted by $Pr(\omega_A)$. Given the feature vectors $h_t = \{h_t^{(i)}\}_{i=1}^D$ learned from the observed data, the attention decoder component 402 can train the neural network to model the posterior distribution over the space of parameters $\omega_A$ by resorting the Bayes' theorem in accordance with Equation 3 below.

$$Pr\left(\omega_A \mid \{h_t^{(i)}\}_{i=1}^D\right) = \frac{Pr(\{h_t^{(i)}\}_{i=1}^D \mid x_{t-1}, \omega_A) Pr(\omega_A)}{Pr(\{h_t^{(i)}\}_{i=1}^D \mid x_{t-1})} \qquad (3)$$

Wherein $x_{t-1}$ can be the form for the training sequences $\{x_{t-1}, \ldots, x_{t-m}\}$ from all D time series at time t. Further, the attention decoder component 402 can regularly update and/or transform Equation 3 as t advances. Thus, if t is the last time stamp in the training set $$Pr\left(\omega_A \mid \{h_t^{(i)}\}_{i=1}^D\right)$$

can be considered as characterizing the latest state of the posterior distribution. In various embodiments described herein, the probability can be denoted as $Pr(\omega_A | h_t)$.

Having determined the posterior distribution over the network parameters, the attention decoder component 402 can further determine the expectation over the set of attention variables $a_t = \{a_t^{(i)}\}_{i=1}^D$ in accordance with Equation 4 below.

$$E_{Pr(\omega_A | h_t)}[a_t | h_t] = \int f^{\omega_A}(h_t, \omega_A) Pr(\omega_A | h_t) d\omega_A \qquad (4)$$

Wherein $f^{\omega_A}(h_t, \omega_A)$ can denote the attention layer (e.g., implementing the additive form).

Directly computing the integrals in Equations 3-4 can be intractable via conventional Bayesian approaches given the large number of continuous variables involved in $\omega_A$. However, the attention decoder component 402 can enable such computations by exploiting a variation inference technique for approximation. For instance, the attention decoder component 402 can choose a family of distributions $Q_\theta(\omega_A)$ parameterized by $\theta$ as the variational posterior to approximate the ground truth posterior distribution $Pr(\omega_A | h_t)$. The $Q_\theta(\omega_A)$ can have a known functional form, and the attention decoder component 402 can the parameters $\theta$ such that its Kullback-Leibler ("KL") distance to the true distribution $Pr(\omega_A | h_t)$ can be minimized in accordance with Equation 5 below.

$$\theta^* = \underset{\theta}{\operatorname{argmin}} \int \log Q_\theta(\omega_A) \frac{Q_\theta(\omega_A)}{Pr(\omega_A \mid h_t)} \quad (5)$$

The KL-distance can be referred to as the relative entropy and can be an effective tool to quantify the distance between the two data distributions. The KL-distance can be zero when the two distributions are identical. However, the measure is not symmetric, and the attention decoder component 402 can employ the reverse-KL form to force the machine learning model to learn $Q_A(\omega_A)$ such that it is squeezed under the posterior distribution (e.g., $Q_\theta(\omega_A)$ can be zero whenever $Pr(\omega_A \mid h_t)$ is zero.

Given the learned variational distribution $Q_\theta(\omega_A)$, the attention decoder component 402 can effectively approximate Equation 4 via a Monte-Carlo sampling. In particular, $E_{Pr(\omega_A \mid h_t)}[a_t \mid h_t]$ can be a D-dimensional vector due to the weighted average from the output of $f^{\omega_A}(h_t, \omega_A)$. After passing through a softmax layer of the neural network model, the attention weights can form a discrete distribution corresponding to the amount of information discovered from D input time series that can be further employed by the prediction component 404 in predicting $x_t^{(d)}$ at output at time stamp t. In various embodiments, the prediction component 404 can predict one or more values of a measurable property characterized by the multivariant time series data based on one or more discovered dependencies and/or uncertainty quantifications facilitated by the attention decoder component 402.

Figure 5:
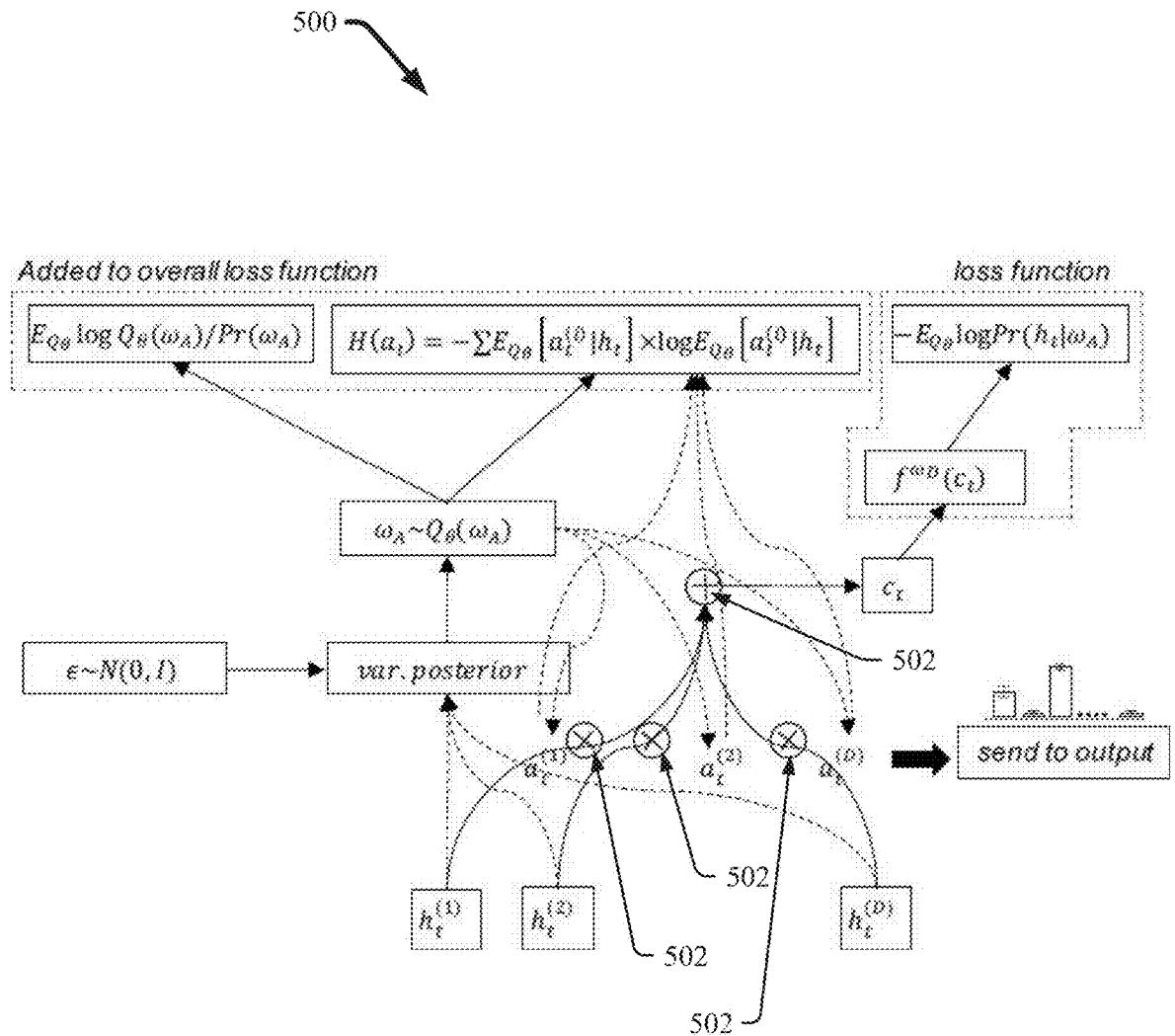
FIG. 5 illustrates a diagram of an example, non-limiting learning objective function that can be implemented by one or more machine learning models to discover dependencies from multivariate time series data in accordance with one or more embodiments described herein.

The attention network developed by the attention decoder component 402 can favor attention vectors with small entropy values to avoid instability in results when some of $h_t^{(i)}$ are close to zero. Small entropy values can also encourage the neural network to place attention mass into a few input time series, wherein the largest entropy can be equivalent to the placing attention weights equally on all input time series and thus does not reveal clearly the dependencies of d-th time series on the other. The attention decoder component 402 can regularize the learning process of the variational posterior in accordance with Equation 6 below.

$$\theta^* = \underset{\theta}{\operatorname{argmin}} \int \log Q_\theta(\omega_A) \frac{Q_\theta(\omega_A)}{Pr(\omega_A \mid h_t)} d\omega_A - \quad (6)$$
$$\sum_{i=1}^{D} E_{Q\theta}[a_t^{(i)} \mid h_t] \log E_{Q_\theta}[a_t^{(i)} \mid h_t]$$

Wherein the second term can be the entropy computed at time stamp t, and $Q_\theta(\omega_A)$ can be employed as the approximation for $Pr(\omega_A \mid h_t)$ shown in FIG. 5. Both terms in Equation 6 can be entropies defined on proper data distributions, thereby rendering the units comparable. Under the framework of variational inference, the attention decoder component 402 can further decompose the first term of Equation 6 in accordance with Equation 7 below.

$$\int \log Q_\theta(\omega_A) \frac{Q_\theta(\omega_A)}{Pr(\omega_A \mid h_t)} \omega_A = \quad (7)$$
$$E_{Q_\theta} \log \frac{Q_\theta(\omega_A)}{Pr(\omega_A)} + \log Pr\{h_t\} - E_{Q_\theta} \log Pr(h_t \mid \omega_A)$$

Since $Pr(h_t) = Pr(f^{\omega_E}(\{x_{t-1}, \ldots, x_{t-m}\}))$ as the data evidence, it can be independent from the optimized parameters $\theta$ and can be omitted. Thereby, the learning objective function of the machine learning model employed by the time series analysis component 110 can be characterized by Equation 8 below.

$$\theta^* = \underset{\theta}{\operatorname{argmin}} E_{Q\theta} \log \frac{Q_\theta(\omega_A)}{Pr(\omega_A)} - \quad (8)$$
$$E_{Q_\theta} \log Pr(h_t \mid \omega_A) - \sum_{i=1}^{D} E_{Q\theta}[a_t^{(i)} \mid h_t] \log E_{Q_\theta}[a_t^{(i)} \mid h_t]$$

Absent prior preference, a general choice for $Q_\theta(\omega_A)$ can be a normal distribution. Moreover, the attention decoder component 402 can employ the stochastic gradient descent by rendering the loss function differentiable. As all the expectation terms are $Q_\theta(\omega_A)$ whose parameters are under optimization, the re-parameterization gradient can be applied for backpropagation. For instance, the attention decoder component 402 can first sample $\epsilon$ from the parameter-free distribution N(0,I) and then transform it with a deterministic function for which the gradient is defined.

Having the optimal $Q_{\theta*}(\omega_A)$ that well approximates $Pr(h_t \mid \omega_A)$, the prediction component 404 can predict the next value $x_t^{(d)}$ given the input sequence from D time series $x_{t-1}^{t-m} = \{x_{t-1}, \ldots, x_{t-m}\}$ at time stamp t in accordance with Equation 9 below.

$$Pr(x_t^{(d)} \mid x_{t-1}^{t-m}) = \quad (9)$$
$$\int \int Pr(x_t^{(d)} \mid a_t, \omega_A, x_{t-1}^{t-m}) Pr(a_t \mid \omega_A, h_t) Q_{\theta*}(\omega_A) da_t d\omega_A =$$
$$\int Pr(x_t^{(d)} \mid a_t, \omega_A, h_t) Q_{\theta*}(\omega_A) d\omega_A$$

From the first line to the second line of Equation 9, the attention decoder component 402 can employ the fact that $h_t$ is deterministic given $x_{t-1}^{t-m}$ through $f^{\omega_E}(x_{t-1}^{t-m})$, and $a_t$ is deterministic given $\omega_A$ through $f^{\omega_A}(h_t, \omega_A)$, leading Pr $(a_t \mid \omega_A, h_t)$ is certain.

In practice for inference, a first sampling can be employed K times $\omega_A$ from $Q_\theta(\omega_A)$ (e.g., via the reparameterization techniques described herein). For each sampled $\omega_A$, an attention vector can be computed according to $f^{\omega_A}(h_t, \omega_A)$. Along with the feature vectors $h_t$, the attention vectors can be inputs to compute the conditional distribution Pr $(x_t^{(d)} \mid a_t, \omega_A, h_t)$, which can be equivalent to an ensemble of K neural networks and their output values from a distribution. Further, the attention decoder component 402 can compute confidence values on both the attention weights as well as the output predictive value. For example, the larger value of K, the more confidence assigned to the approximate quantities.

FIG. 5 illustrates a diagram of an example, non-limiting learning objective function 500 that can be employed by the one or more attention decoder components 402 and/or prediction components 404 in accordance with one or more embodiments described herein. Repetitive description of like elements employed in other embodiments described herein is omitted for sake of brevity. FIG. 5 can depict the learning objective function 500 with regards to a neural network in which interconnections between a plurality of processing units 502 are delineated by dashed lines.

As described herein and shown in FIG. 5, the attention decoder component 402 can employ a multilayer perceptron ("MLP") neural network to learn the variational posterior distributions. Parameters on edges of the machine learning model can be encoded (e.g., via encoder component 202) by a mixture model θ (e.g., a Gaussian model). The $\omega_A$ values can be sampled from variational posterior $Q_\theta(\omega_A)$ and/or can be employed by the attention decoder component 402 to decode attentive information $a_1, a_2, \ldots a_m$ on corresponding hidden vectors $h_1, h_2, \ldots h_m$. The prior distribution $Pr_\phi(\omega_A)$ can be parameterized and tunable (e.g., also comprising a mixture model).

The KL $(Q_\theta(\omega_A)\|Pr_\phi(\omega_A))$ can denote the divergence between the variational posterior and the prior posterior, and can be further added by the attention decoder component 402 to the overall learning objective function 500 in accordance with the various embodiments described herein. Further, the H(a) term can be employed by the attention decoder component 402 to calculate entropy over the attention weights. For example, the weights for attentive information $a_1, a_2, \ldots a_D$ can be the softmax layer applied on an alignment between the sampled w and $h_1, h_2, \ldots h_D$ values. As described in various embodiments herein and shown in FIG. 5, the attention decoder component 402 can further add H(a) to the overall loss function, whereupon it can serve as a regularization term that can penalize the machine learning models and generate uniform attention. Also shown in FIG. 5, $s_k$ can denote context vector weight aggregated from $h_1, h_2, \ldots h_D$ and can serve as the input to the k-th final output, being decoded as the next value in the series k. Moreover, each vector computed from one time Monte Carlo sampling $\omega_A$ from the posterior distribution can be output as stochastic attention. In various embodiments the resulting output can be shared with the one or more input devices 106 (e.g., via the communications component 112 and/or the one or more networks 104).

Figure 6:
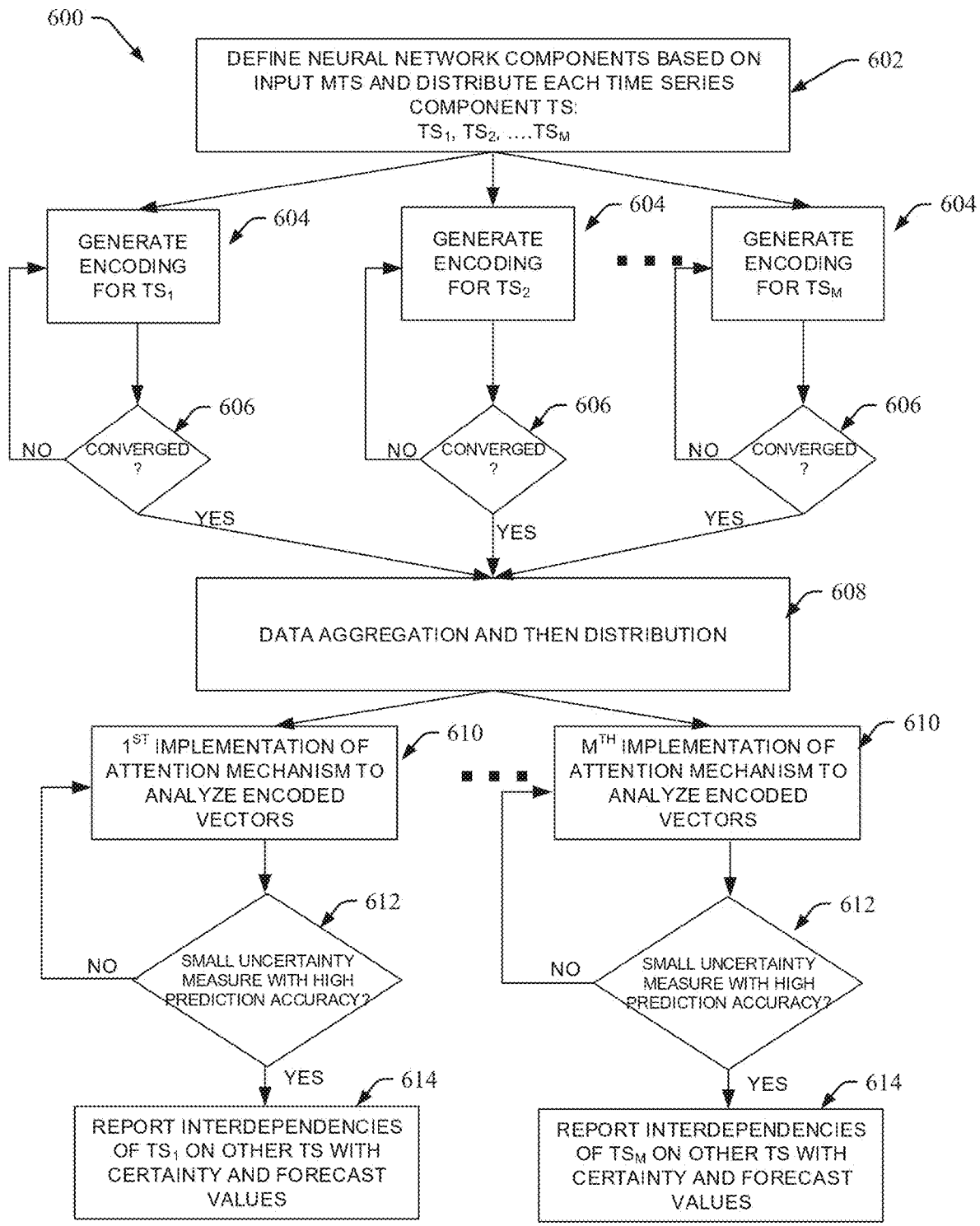
FIG. 6 illustrates a flow diagram of an example, non-limiting method that can implemented by one or more autonomous computer systems to discover one or more dependencies between multivariate time series data in accordance with one or more embodiments described herein.

FIG. 6 illustrates a flow diagram of an example, non-limiting method 600 that can facilitate an analysis of multivariant time series data by the system 100 in accordance with one or more embodiments described herein. Repetitive description of like elements employed in other embodiments described herein is omitted for sake of brevity.

At 602, method 600 can comprise defining (e.g., via time series analysis component 110) neural network components based on input multivariant time series ("MTS") data, and distributing (e.g., via time series analysis component 110) each time series component ("TS") of the data to respective components. For example, the MITS data can be inputted by one or more data collection components 122 in accordance with various embodiments described herein. At 604, method 600 can comprise generating (e.g., via encoder component 202) an encoding for each of the distributed TS. For example, step 604 can comprise encoding one or more intermediate feature vectors for each of the distributed TS in accordance with various embodiments described. At 606, the encoding at 604 can be analyzed to ascertain convergence. Wherein the encoding achieves convergence, the method 600 can proceed to 608; wherein the encoding does not converge, the method 600 can repeat 604 until convergence is achieved.

At 608, the method 600 can comprise aggregating (e.g., via aggregation component 302) the encoded data and then distributing the encoded data to one or more attention decoders. At 610, the method 600 can comprise implementing (e.g., via attention decoder component 402 and/or prediction component 404) one or more attention mechanisms to analyze the encoded vectors. As shown in FIG. 6, implementation of the attention mechanisms can be implemented a plurality of times (e.g., simultaneously or sequentially) with regards to respective TS. For example, the one or more attention mechanisms can be implemented in accordance with the various features described herein, such as Equations 1-9 and/or the learning objective function depicted in FIG. 5.

At 612, the attention values resulting from the attention mechanisms at 610 can be evaluated to determine whether the values are associated with a small uncertainty measure (e.g., Shannon entropy value) and high prediction accuracy. A defined entropy threshold (e.g., set via one or more input devices 106) can be employed to evaluate whether the uncertainty measure (e.g., Shannon entropy values) are small enough to be considered acceptable. Additionally, a defined confidence threshold (e.g., set via one or more input devices) can be employed to evaluate whether an associate confidence value corresponds to an expected high prediction accuracy. Wherein the entropy value is found to be too high (e.g., greater than the defined entropy threshold) and/or the prediction accuracy found to be too low (e.g., lower than the defined confidence threshold), the method 600 can repeat step 610. Wherein the entropy value is found to be sufficiently small (e.g., less than the defined entropy threshold) and/or the prediction accuracy found to be sufficiently high (e.g., higher than the defined confidence threshold), the method 600 can proceed to step 614. At 614, the method 600 can comprise reporting (e.g., via the time series analysis component 110, communications component 112, networks 104, and/or input devices 106), the interdependencies of the respective TS with regards to the other TS of the MTS along with certainty and/or forecast values.

Figure 7:
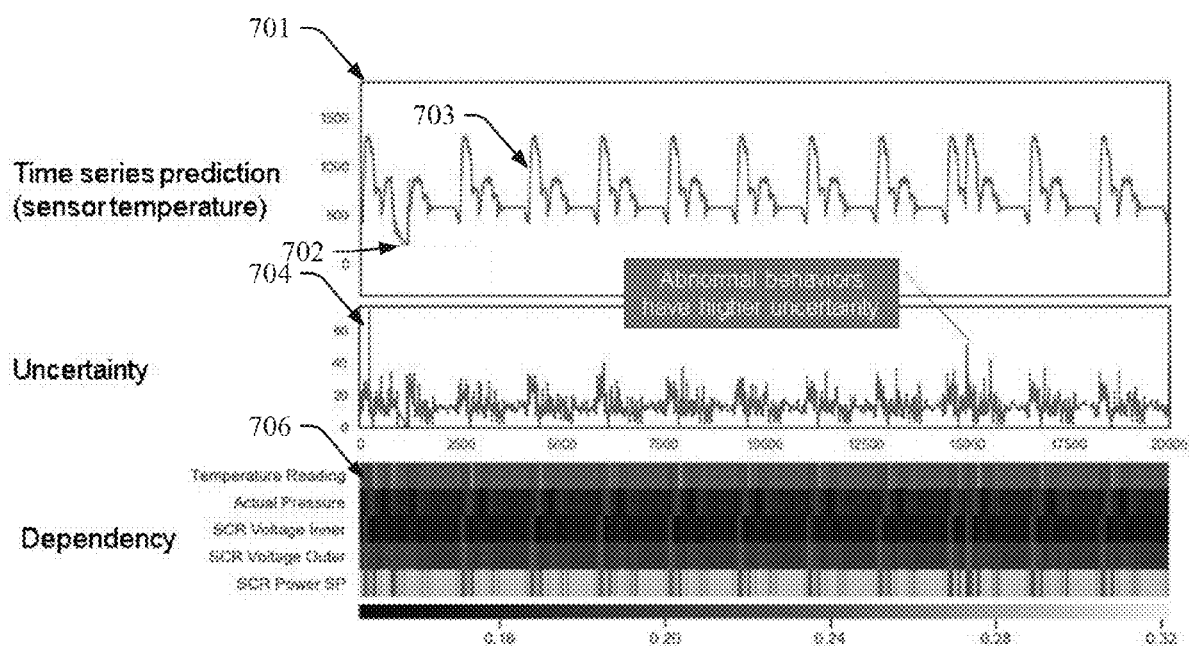
FIG. 7 illustrates a diagram of example, non-limiting graphs that can demonstrate the efficacy one or more machine learning technologies in discovering dependencies in multivariate time series data, forecasting time series data, and/or quantifying an associate amount of uncertainty in accordance with one or more embodiments described herein.
Figure 8:
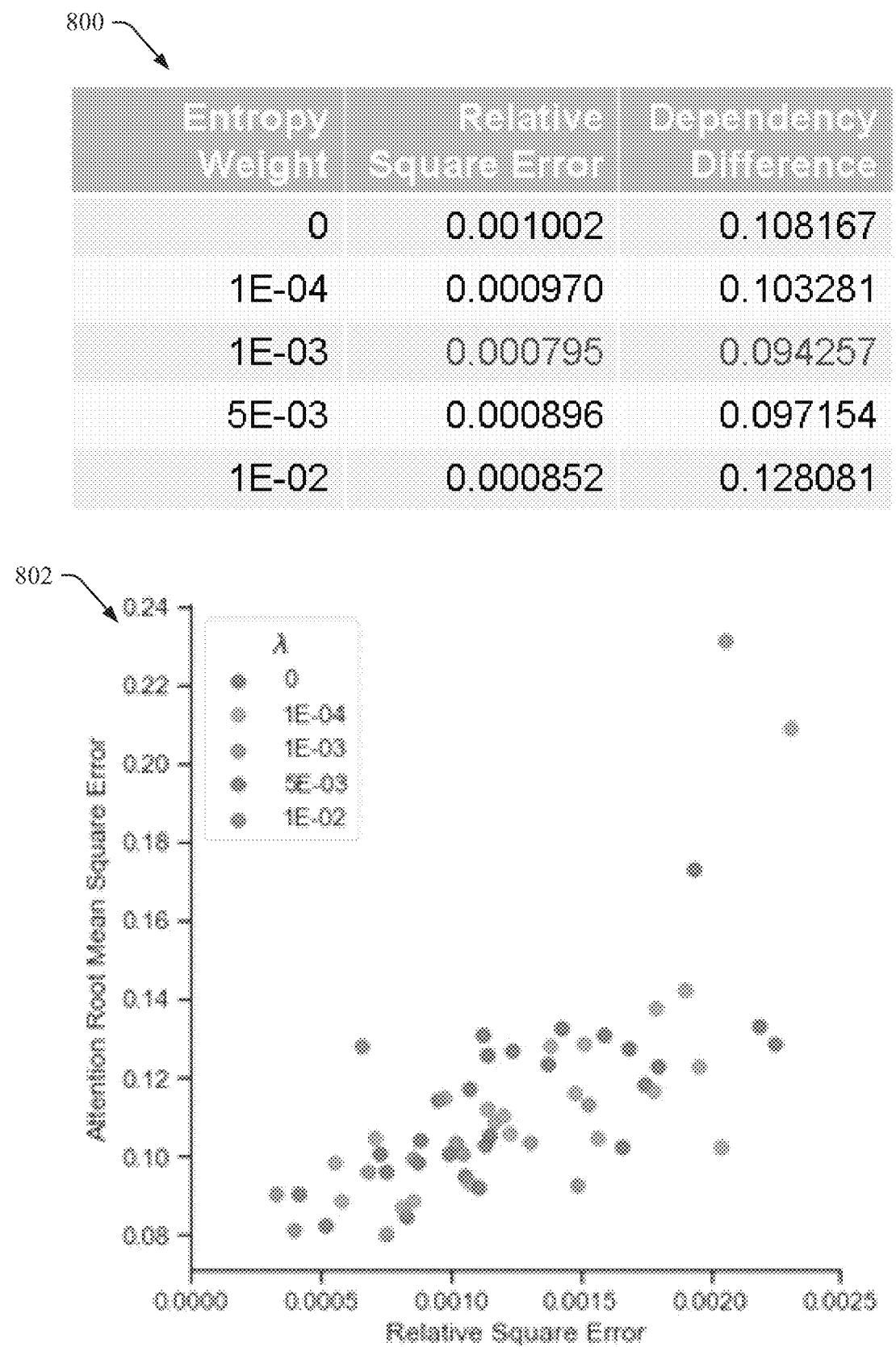
FIG. 8 illustrates a diagram of example, non-limiting charts and graphs that can demonstrate the efficacy of one or more system that can discover dependencies within multivariate time series data in accordance with one or more embodiments described herein.

FIGS. 7-8 illustrate diagrams of an example, non-limiting graphs and charts that can demonstrate the efficacy of the system 100 in accordance with one or more embodiments described herein. Repetitive description of like elements employed in other embodiments described herein is omitted for sake of brevity. For example, FIG. 7 illustrates prediction values, uncertainty values, and/or dependency values that can be generated by the time series analysis component 110. The time series depicted in FIG. 7 can regard temperature data measured by one or more temperature sensors of the one or more data collection components 122. As show in FIG. 7, graph 701 shows time series predictions mapped against the time series values that were later measured; graph 704 shows uncertainty values associated with the predictions and/or dependencies determined by the time series analysis component 110; and graph 706 shows dependencies in the multivariant time series data that were discovered by the time series analysis component 110. With regards to graph 701, line 702 can represent the predicted MTS data, and line 703 can represent the measured MTS data; wherein lines 702 and 703 significantly overlap (e.g., thereby demonstrating high accuracy of the predictions). As shown in graph 706, the one or more observable systems 108 can be characterized by multiple measurable properties, including: temperature, actual pressure, a first silicon controlled rectifier ("SCR") voltage (e.g., "SCR voltage inner"), a second SCR voltage (e.g., "SCR voltage outer"), and/or SCR power (e.g., "SCR power SP"). The plurality of measurable properties can be ascertained by one or more sensors of the data collection components 122 and characterized by the multivariate time series data. Additionally, the dependencies between the measurable properties can exist within the observed system, as those dependencies can be discovered by the time series analysis component 110 as reported in graph 706.

Chart 800 and graph 802 regard synthetic data used to demonstrate the efficacy of the system 100. Synthetic multivariate time series data has a known ground truth of dependency, which can be used to verify the dependency predictions generated by the time series analysis component 110. The results depicted in chart 800 and graph 802 were regard an analysis of 10 time series components by the time series analysis component 110. As shown in FIG. 8, the entropy regularization incorporated into the attention mechanisms employed by the attention decoder component 402 can enhance the accuracy of discovered dependencies and/or generated predictions.

Figure 9:
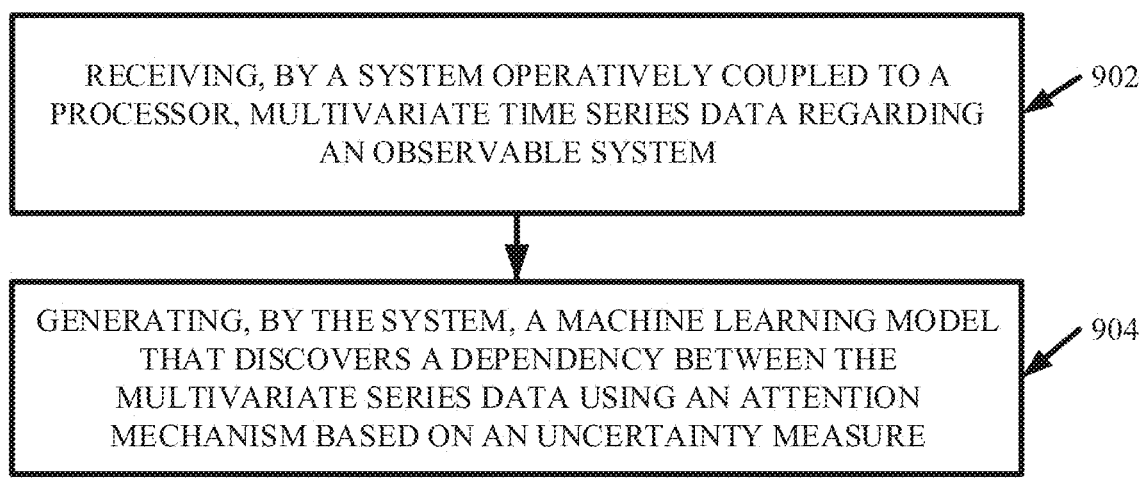
FIG. 9 illustrates a flow diagram of an example, non-limiting computer-implemented method that can facilitate discovering dependencies within multivariate time series data in accordance with one or more embodiments described herein.

FIG. 9 illustrates a flow diagram of an example, non-limiting computer-implemented method 900 that can facilitate a timer series data analysis via system 100 in accordance with one or more embodiments described herein. Repetitive description of like elements employed in other embodiments described herein is omitted for sake of brevity.

At 902, the computer-implemented method 900 can comprise receiving (e.g., via communications component 112), by a system 100 operatively coupled to a processor 120, multivariate time series data regarding one or more observable systems 108. For example, the multivariate time series data can include one or more measurable properties that can characterize the one or more observable systems 108. For instance, the multivariate time series data can be collected, measured, detected, and/or generated by one or more data collection components 122 in accordance with the various embodiments described herein.

At 904, the computer-implemented method 900 can comprise generating (e.g., via time series analysis component 110), by the system 100, one or more machine learning models (e.g., neural network models) that can discover one or more dependencies between the multivariate time series data using one or more attention mechanisms based on one or more uncertainty measures (e.g., Shannon entropy values). For example, the one or more attention mechanisms can be implemented in accordance with the various embodiments described herein, including Equations 1-9 and/or the learning objective function depicted on FIG. 5.

Figure 10:
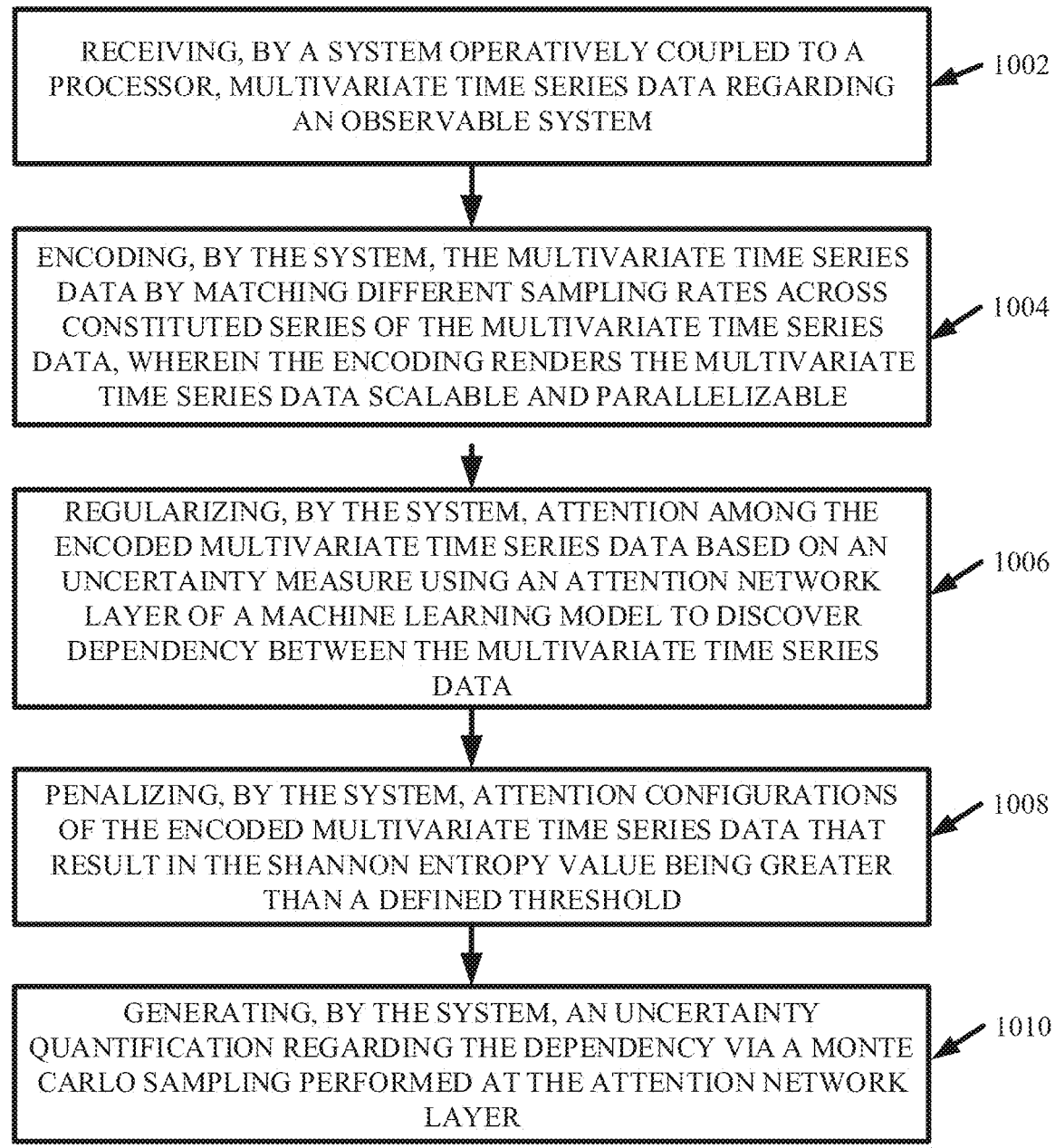
FIG. 10 illustrates a flow diagram of an example, non-limiting computer-implemented method that can facilitate discovering dependencies within multivariate time series data in accordance with one or more embodiments described herein.

FIG. 10 illustrates a flow diagram of an example, non-limiting computer-implemented method 1000 that can facilitate a timer series data analysis via system 100 in accordance with one or more embodiments described herein. Repetitive description of like elements employed in other embodiments described herein is omitted for sake of brevity.

At 1002, the computer-implemented method 1000 can comprise receiving (e.g., via communications component 112), by a system 100 operatively coupled to a processor 120, multivariate time series data regarding one or more observable systems 108. For example, the multivariate time series data can include one or more measurable properties that can characterize the one or more observable systems 108. For instance, the multivariate time series data can be collected, measured, detected, and/or generated by one or more data collection components 122 in accordance with the various embodiments described herein.

At 1004, the computer-implemented method 1000 can comprise encoding (e.g., via encoder component 202), by the system 100, the multivariate time series data by matching different sampling rates across constituted series of the multivariate time series data, wherein the encoding at 1004 can render the multivariate time series data scalable and parallelizable. At 1006, the computer-implemented method 1000 can comprise regularizing (e.g., via attention decoder component 402), by the system 100, attention among the encoded multivariate time series data based on an uncertainty measure (e.g., Shannon entropy value) using one or more attention network layers of a machine learning model (e.g., neural network model) to discover one or more dependencies between the multivariate time series data.

At 1006, the computer-implemented method 1000 can comprise penalizing (e.g., via attention decoder component 402), by the system 100, attention configurations of the encoded multivariate time series data that result in the uncertainty measure (e.g., Shannon entropy value) being greater than a defined threshold (e.g., thereby penalizing high entropy value results that can be associated with volatility and low prediction accuracy). At 1008, the computer-implemented method 1000 can comprise generating (e.g., via attention decoder component 402), by the system 100, one or more uncertainty quantifications regarding the dependency via a Monte Carlo sampling performed at the attention network layer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources wh ere the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
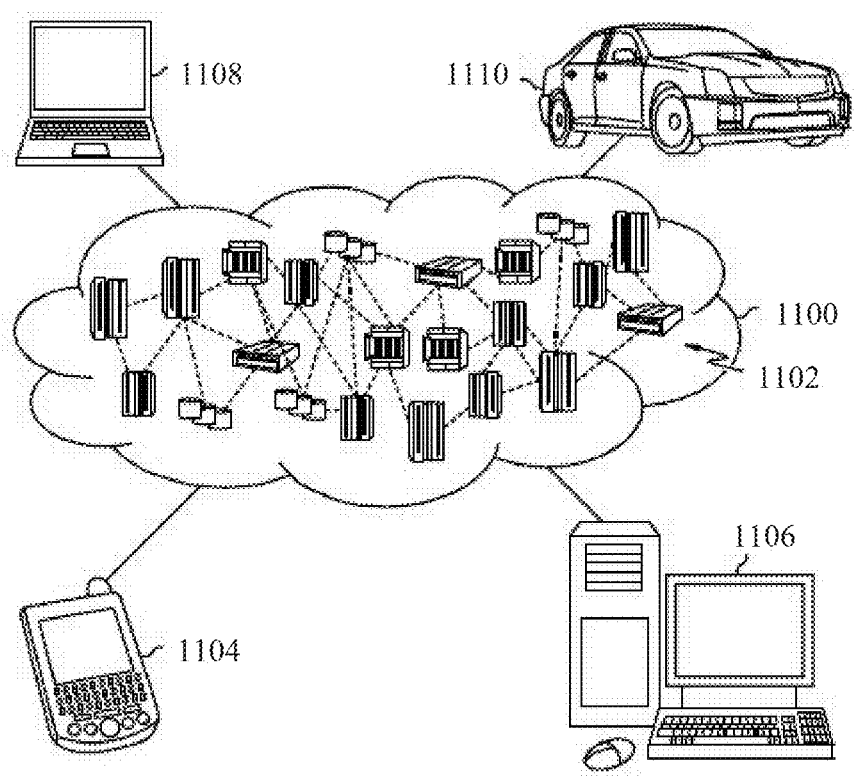
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need t maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
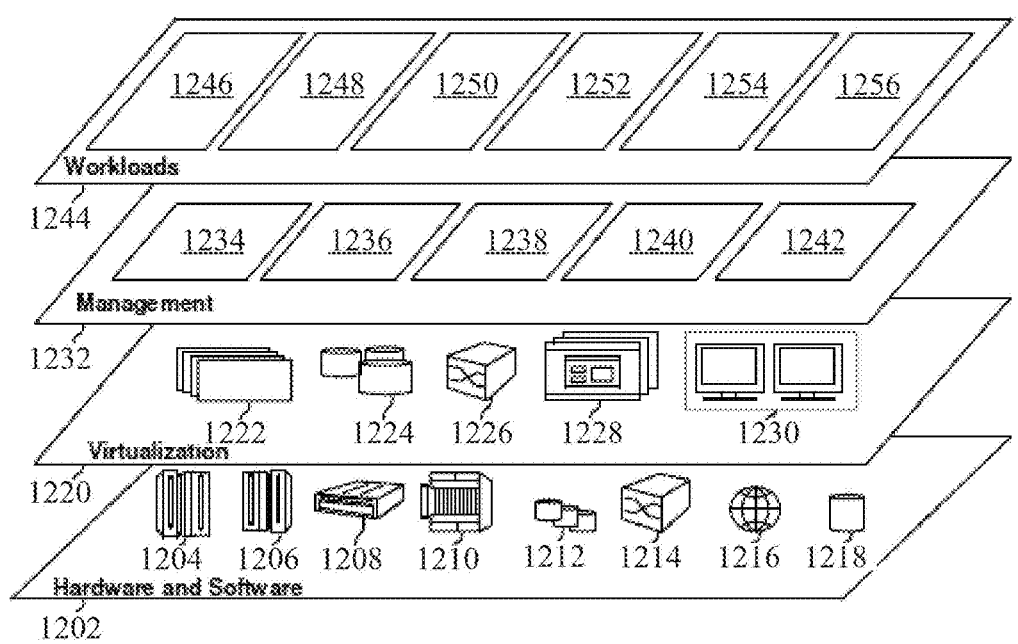
FIG. 12 depicts abstraction model layers in accordance with one or more embodiments described herein

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and multivariate time series analysis 1256. Various embodiments of the present invention can utilize the cloud computing environment described with reference to FIGS. 11 and 12 to collect the multivariate time series data and/or employ the one or more attention mechanisms (e.g., via machine learning models) described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 13:
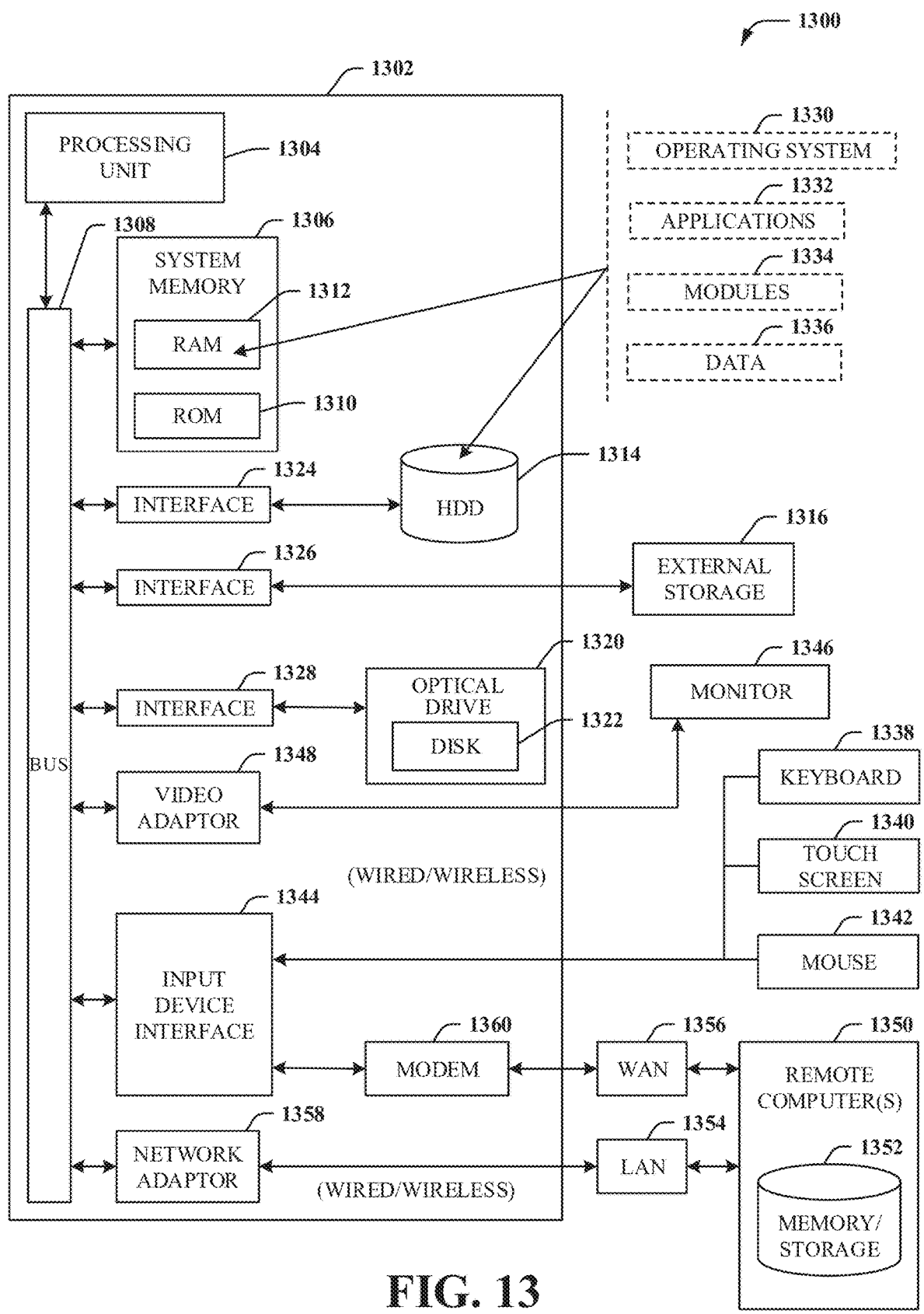
FIG. 13 illustrates a block diagram of an example, non-limiting operating environment in which one or more embodiments described herein can be facilitated.

In order to provide additional context for various embodiments described herein, FIG. 13 and the following discussion are intended to provide a general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per seas modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system ("BIOS") can be stored in a non-volatile memory such as ROM, erasable programmable read only memory ("EPROM"), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive ("HDD") 1314 (e.g., EIDE, SATA), one or more external storage devices 1316 (e.g., a magnetic floppy disk drive ("FDD") 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive ("SSD") could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine ("VM") of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1302, e.g., applied at the application execution level or at the operating system ("OS") kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network ("LAN") 1354 and/or larger networks, e.g., a wide area network ("WAN") 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point ("AP") disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a time series analysis component that generates a machine learning model that discovers a dependency between multivariate time series data using an attention mechanism based on an uncertainty measure; and
an attention decoder component that employs an attention network layer of the machine learning model, wherein the attention network layer penalizes attention configurations of the encoded multivariate time series data that result in the uncertainty measure being smaller than a defined threshold.

2. The system of claim 1, further comprising:
an encoder component that encodes the multivariate time series data by matching data different sampling rates across constituted series of the multivariate time series data, and wherein encoding renders the multivariate time series data scalable and parallelizable.

3. The system of claim 2, wherein the attention decoder component regularizes attention among the encoded multivariate time series data based on the uncertainty measure using the attention network layer of the machine learning model.

4. The system of claim 3, wherein the attention decoder component further determines a posterior distribution of parameters that governs the attention network layer via a Bayes inference.

5. The system of claim 3, wherein the attention decoder component further generates an uncertainty quantification regarding the dependency via a Monte Carlo sampling performed at the attention network layer.

6. The system of claim 5, wherein the multivariant time series data characterizes a measurable property, and wherein the system further comprises:
a prediction component that predicts a value of the measurable property based on the discovered dependency and the uncertainty quantification.

7. A computer-implemented method, comprising:
generating, by a system operatively coupled to a processor, a machine learning model that discovers a dependency between multivariate time series data using an attention mechanism based on an uncertainty measure; and
penalizing, by the system, attention configurations of an encoded multivariate time series data that result in an uncertainty measure being smaller than a defined threshold.

8. The computer-implemented method of claim 7, further comprising:
encoding, by the system, the multivariate time series data by matching different data sampling rates across constituted series of the multivariate time series data, wherein the encoding renders the multivariate time series data scalable and parallelizable.

9. The computer-implemented method of claim 8, further comprising:
regularizing, by the system, attention among the encoded multivariate time series data based on the uncertainty measure using an attention network layer of the machine learning model.

10. The computer-implemented method of claim 9, further comprising:
determining, by the system, a posterior distribution of parameters that governs the attention network layer via a Bayes inference.

11. The computer-implemented method of claim 9, further comprising:
generating, by the system, an uncertainty quantification regarding the dependency via a Monte Carlo sampling performed at the attention network layer.

12. The computer-implemented method of claim 11, wherein the multivariant time series data characterizes a measurable property, and wherein the computer-implemented method further comprises:
predicting, by the system, a value of the measurable property based on the discovered dependency and the uncertainty quantification.

13. A computer program product for analyzing multivariate time series data, the computer program product comprising a computer readable storage medium having program instructions embodied therewith, the program instructions executable by a processor to cause the processor to:
generate, by the processor, a machine learning model that discovers a dependency between the multivariate time series data using an attention mechanism based on an uncertainty measure; and
penalize, by the processor, attention configurations of an encoded multivariate time series data that result in an uncertainty measure being smaller than a defined threshold.

14. The computer program product of claim 13, wherein the program instructions further cause the processor to:
encode, by the processor, the multivariate time series data by matching different data sampling rates across constituted series of the multivariate time series data, wherein encoding renders the multivariate time series data scalable and parallelizable.

15. The computer program product of claim 14, wherein the program instructions further cause the processor to:
regularize, by the processor, attention among the encoded multivariate time series data based on the Shannon entropy value using an attention network layer of the machine learning model.

16. The computer program product of claim 13, wherein the program instructions further cause the processor to:
determining, by the processor, a posterior distribution of parameters that governs the attention network layer via a Bayes inference.

17. The computer program product of claim 16, wherein the program instructions further cause the processor to:
generate, by the processor, an uncertainty quantification regarding the dependency via a Monte Carlo sampling performed at the attention network layer.

* * * * *